(12) United States Patent
Crall

(10) Patent No.: US 10,731,470 B2
(45) Date of Patent: Aug. 4, 2020

(54) FRANGIBLE AIRFOIL FOR A GAS TURBINE ENGINE

(71) Applicant: General Electric Company, Schenectady, NY (US)

(72) Inventor: David William Crall, Loveland, OH (US)

(73) Assignee: General Electric Company, Schenectady, NY (US)

( * ) Notice: Subject to any disclaimer, the term of this patent is extended or adjusted under 35 U.S.C. 154(b) by 48 days.

(21) Appl. No.: 15/806,871

(22) Filed: Nov. 8, 2017

(65) Prior Publication Data

US 2019/0136698 A1    May 9, 2019

(51) Int. Cl.
*F01D 5/14* (2006.01)
*F01D 5/28* (2006.01)

(52) U.S. Cl.
CPC ............ *F01D 5/147* (2013.01); *F01D 5/282* (2013.01); *F05D 2220/32* (2013.01); *F05D 2240/30* (2013.01); *F05D 2250/12* (2013.01); *F05D 2250/14* (2013.01); *F05D 2250/184* (2013.01); *F05D 2260/311* (2013.01)

(58) Field of Classification Search
CPC ........ F01D 5/147; F01D 5/282; F01D 21/045; F05D 2220/32; F05D 2240/30; F05D 2250/12
USPC ....................................................... 416/224
See application file for complete search history.

(56) References Cited

U.S. PATENT DOCUMENTS

| 3,695,778 | A | * | 10/1972 | Taylor | ..................... | F01D 5/147 |
| | | | | | | 416/92 |
| 4,022,540 | A | | 5/1977 | Young | | |
| 4,111,600 | A | | 9/1978 | Rothman et al. | | |
| 4,390,320 | A | | 6/1983 | Eiswerth | | |
| 4,426,193 | A | | 1/1984 | Carlson | | |
| 4,802,828 | A | | 2/1989 | Rutz et al. | | |
| 5,634,771 | A | * | 6/1997 | Howard | ................... | F01D 5/147 |
| | | | | | | 416/229 R |
| 6,447,248 | B1 | | 9/2002 | Kastl et al. | | |
| 7,114,912 | B2 | * | 10/2006 | Gerez | ..................... | F01D 5/147 |
| | | | | | | 415/9 |
| 7,780,410 | B2 | | 8/2010 | Kray et al. | | |
| 7,972,109 | B2 | | 7/2011 | Crall et al. | | |
| 8,337,158 | B1 | | 12/2012 | Liang | | |
| 8,727,712 | B2 | | 5/2014 | Strock et al. | | |
| 8,840,361 | B2 | | 9/2014 | Bottome | | |
| 9,157,327 | B2 | * | 10/2015 | Deal | ....................... | F01D 5/147 |
| 9,243,512 | B1 | | 1/2016 | Zatorski et al. | | |

(Continued)

FOREIGN PATENT DOCUMENTS

WO    WO2016/114888 A1    7/2016

*Primary Examiner* — David E Sosnowski
*Assistant Examiner* — Eric J Zamora Alvarez
(74) *Attorney, Agent, or Firm* — Dority & Manning, P.A.

(57) ABSTRACT

An airfoil defining a chordwise dimension, a spanwise dimension, a leading edge, a trailing edge, a root, and a tip, is generally provided. The airfoil includes a first material substrate defining a pressure side and a suction side. The first material substrate defines a plurality of discrete volumes extended from at least one of the pressure side or the suction side into the first material substrate. The plurality of discrete volumes is arranged at least partially along the chordwise dimension and a second material substrate different from the first material substrate is defined at least partially within the volume.

4 Claims, 7 Drawing Sheets

(56) References Cited

U.S. PATENT DOCUMENTS

| | | | |
|---|---|---|---|
| 9,914,282 B2* | 3/2018 | Roach | B32B 5/145 |
| 10,450,870 B2* | 10/2019 | Nandula | F01D 21/045 |
| 2008/0075601 A1* | 3/2008 | Giusti | F01D 5/147 |
| | | | 416/229 A |
| 2012/0063909 A1 | 3/2012 | Bottome | |
| 2016/0160659 A1* | 6/2016 | Obuchi | F01D 5/147 |
| | | | 415/200 |
| 2016/0201503 A1 | 7/2016 | Zatorski et al. | |
| 2016/0263856 A1 | 9/2016 | Roach et al. | |
| 2017/0122109 A1* | 5/2017 | Bunker | F01D 25/14 |
| 2017/0226867 A1 | 8/2017 | Nandula et al. | |
| 2017/0370376 A1* | 12/2017 | Kray | F01D 5/142 |
| 2019/0242399 A1* | 8/2019 | Kray | F01D 5/282 |

* cited by examiner

SECTION A-A

FRANGIBLE AIRFOIL FOR A GAS TURBINE ENGINE

FIELD

The present subject matter is directed to a frangible airfoil for a gas turbine engine.

BACKGROUND

Gas turbine engines, such as turbofans, generally include fan cases surrounding a fan assembly. The fan cases are generally configured to withstand an impact of the fan blades due to adverse engine conditions resulting in a failure mode, such as foreign object damage, hard rubs due to excessive or extreme unbalance or fan rotor oscillations, or fan blade liberation. However, such airfoil configurations generally increase the weight of the fan case, thereby increasing the weight of the engine and aircraft and reducing performance and efficiency.

Known fan cases generally include frangible structures, such as honeycombs or trench-filler material, configured to mitigate load transfer to and through the fan case. However, this approach is generally costly. Furthermore, this approach may result in larger, heavier, less efficient fan cases. Still further, this approach may not address issues relating to fan rotor unbalance following deformation or liberation of one or several airfoils such as fan blades.

As such, there is a need for an airfoil that enables a controlled and consistent failure mode of the airfoil that may enable reducing a cost, weight, and load transfer to a surrounding casing.

BRIEF DESCRIPTION

Aspects and advantages of the invention will be set forth in part in the following description, or may be obvious from the description, or may be learned through practice of the invention.

Embodiments of an airfoil defining a chordwise dimension, a spanwise dimension, a leading edge, a trailing edge, a root, and a tip, are generally provided. The airfoil includes a first material substrate defining a pressure side and a suction side. The first material substrate defines a plurality of discrete volumes extended from at least one of the pressure side or the suction side into the first material substrate. The plurality of discrete volumes is arranged at least partially along the chordwise dimension and a second material substrate different from the first material substrate is defined at least partially within the volume.

In one embodiment, the second material is defined approximately flush to the pressure side, the suction side, or both, of the first material substrate.

In another embodiment, the airfoil defines a thickness from the pressure side to the suction side, and the volume is defined through at least approximately 85% of the thickness of the airfoil.

In various embodiments, the plurality of discrete volumes is defined within approximately 95% of the chordwise dimension from the trailing edge of the airfoil. In one embodiment, the plurality of discrete volumes is defined within approximately 85% of the chordwise dimension from the trailing edge of the airfoil.

In still various embodiments, the volume is defined within approximately 90% to approximately 97% of the spanwise dimension from the root of the airfoil. In one embodiment, the volume is defined at two or more spanwise dimensions of the airfoil. In another embodiment, the plurality of discrete volumes is defined approximately as a waveform along the pressure side, the suction side, or both, through the first material substrate.

In one embodiment, approximately 15% of less of a cross sectional area of the first material substrate along the chordwise dimension is defined by the second material substrate.

In another embodiment, the volume defines an approximately circular cross sectional area through the pressure side, the suction side, or both.

In still another embodiment, the volume defines a racetrack, an elliptical, a rectangular, or an oblong cross sectional area through the pressure side, the suction side, or both.

In still yet another embodiment, the volume defines a cross sectional area defining a length and a height through the first material substrate, and wherein a ratio of the length versus the height is approximately 3.0 or less.

In one embodiment, a first volume of the plurality of volumes is defined from the pressure side of the first material substrate and a second volume of the plurality of volumes is defined from the suction side of the first material substrate.

In another embodiment, the volume is extended at least partially along the chordwise dimension of the airfoil through the first material substrate.

In still another embodiment, the volume is extended at least partially along the spanwise dimension of the airfoil through the first material substrate.

In still yet another embodiment, the second material substrate at least substantially fills the volume through the first material substrate.

In various embodiments, the airfoil further includes a third material layer at least partially surrounding the first material substrate. In one embodiment, the third material layer is defined over approximately 15% of less of the chordwise dimensions from the leading edge along the pressure side, the suction side, or both. In another embodiment, the volume is further defined at least partially through the third material layer from the pressure side, the suction side, or both. In still another embodiment, the second material substrate at least substantially fills the volume through the third material layer.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
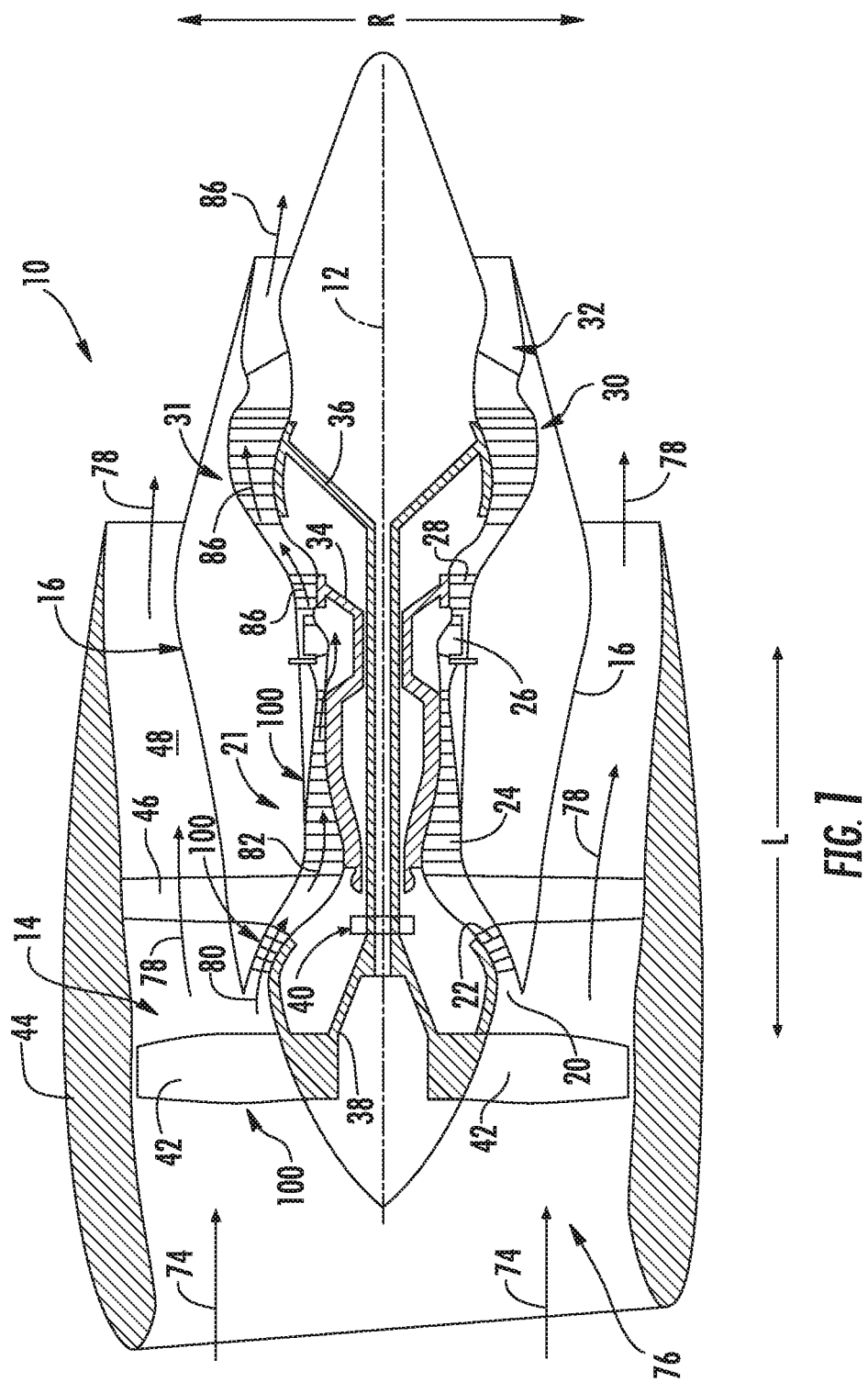
FIG. 1 is an exemplary embodiment of a gas turbine including an exemplary airfoil according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Ranges of values discussed herein are inclusive unless otherwise stated. For example, a stated range of approximately "A" to "B" includes "A" and "B", and approximations thereto, such as 10% greater or lesser than.

Embodiments of an airfoil that enables a controlled and consistent failure mode of the airfoil that may enable reducing a cost, weight, and load transfer to a surrounding casing are generally provided. The embodiments generally shown and described herein may enable a controlled and consistent failure of the airfoil, such as a fan blade, following a failure event, such as a hard rub against a surrounding fan case. The embodiments generally described herein enable an airfoil to deform or detach at a desired spawn of the airfoil to mitigate load transfer to a surrounding casing. The embodiments generally provided herein may further enable the airfoil to deform or detach such that excessive or extreme unbalance of the fan rotor may be reduced following a failure event, such as airfoil liberation, foreign object damage (e.g., bird strikes, icing, etc.), or loss of lube or damper to a bearing assembly.

Referring now to the drawings, FIG. 1 is a schematic cross sectional view of an exemplary gas turbine engine 10 (herein referred to as "engine 10"), shown as a high bypass turbofan engine, incorporating an exemplary embodiment of an airfoil 100 according to an aspect of the present disclosure. Although further described below with reference to a turbofan engine, the present disclosure is also applicable to turbomachinery in general, including propfan, turbojet, turboprop, and turboshaft gas turbine engines, including marine and industrial turbine engines and auxiliary power units. As shown in FIG. 1, the engine 10 has a longitudinal or axial centerline axis 12 that extends there through for reference purposes generally along a longitudinal direction L. The engine 10 further defines a radial direction R extended from the axial centerline axis 12.

In general, the engine 10 may include a substantially tubular outer casing 16 that defines an annular inlet 20. The outer casing 16 encases or at least partially flows, in serial flow arrangement, a compressor section 21, a combustion section 26, and a turbine section 31. In the embodiment shown in FIG. 1, the compressor section 21 defines a high pressure (HP) compressor 24 coupled to a HP shaft 34, and a low or intermediate pressure compressor 22 in serial arrangement with the HP compressor 24. The turbine section 31 defines a HP turbine 28 coupled to the HP shaft 34 to extract energy from combustion gases 86 to drive the HP shaft 34 and HP compressor 24.

A fan assembly 14 is disposed forward or upstream of the compressor section 21. The fan assembly 14 includes a fan rotor 38. The fan rotor 38 includes one or more fan stages, in which each fan stage defines a plurality of propeller or fan blades 42 that are coupled to and extend outwardly from the fan rotor 38 in the radial direction R. In one embodiment as shown in FIG. 1, the fan rotor 38 defines a single fan stage or single circumferentially adjacent arrangement of the plurality of blades 42. In various other embodiments, the fan assembly 14 may further define a plurality of the stages. The fan rotor 38 is together rotatable about the axial centerline 12. An annular fan casing or nacelle 44 circumferentially surrounds at least a portion of the fan assembly 14 and/or at least a portion of the outer casing 16. In one embodiment, the nacelle 44 may be supported relative to the outer casing 16 by a plurality of circumferentially-spaced outlet guide vanes or struts 46. At least a portion of the nacelle 44 may extend over an outer portion (in radial direction R) of the outer casing 16 so as to define a bypass airflow passage 48 therebetween.

The turbine section 31 further defines a LP turbine 30 generally downstream of the HP turbine 28. In the embodiment generally provided in FIG. 1, the LP turbine 30 is coupled to a LP shaft 36 to which the LP compressor 22 is coupled. The LP turbine 30 extracts energy from combustion gases 86 to drive the LP compressor 22. In various embodiments, the fan rotor 38 and fan blades 42 are coupled to the LP shaft 36 such as to define a direct drive configuration such that the LP turbine 30 rotates at a generally similar rotational speed as the LP compressor 22 and fan rotor 38. In other embodiments, such as generally provided in FIG. 1, a speed reduction device 40 is coupled to the LP shaft 36 and the fan rotor 38 to define an indirect drive configuration. The indirect drive configuration generally enables a different rotational speed of the fan rotor 38 relative to the LP shaft 36 and LP turbine 30 from which energy is provided. For example, the speed reduction device 40 may define a reduction or power gear assembly, such as, but not limited to, a planetary gear assembly.

Although the embodiment generally provided in FIG. 1 defines a two-spool turbofan engine configuration, it should be appreciated that in still other embodiments the engine 10 may define a three spool configuration, such as defining a fan rotor coupled to a LP turbine via an LP shaft, an intermediate pressure (IP) turbine coupled to an IP compressor via an IP shaft, and a HP turbine coupled to an HP compressor via an HP shaft, in which each combination of shaft, turbine, and compressor/fan are generally mechanically independent such as to enable rotation of one shaft without necessarily driving rotation of another shaft.

Still further, the engine 10 may generally include an exhaust nozzle 32 coupled downstream to the turbine section 31 to direct the flow of combustion gases 86 from the engine 10.

Referring now to FIGS. 2-10, exemplary embodiments of an airfoil 100 according to an aspect of the present disclosure are generally provided. The embodiments of the airfoil 100 generally depicted in FIGS. 2-10 may define the plurality of propeller or fan blades 42 of the exemplary embodiment of the engine 10 generally provided in FIG. 1. However, it should be appreciated that in other embodiments, the airfoil 100 may be defined at other portions of the engine 10 that may utilize a frangible airfoil 100 such as the embodiments generally provided in regard to FIGS. 2-10. For example, the airfoil 100 may be defined in the compressor section 21, such as of a compressor blade coupled to a compressor rotor.

Figure 2:
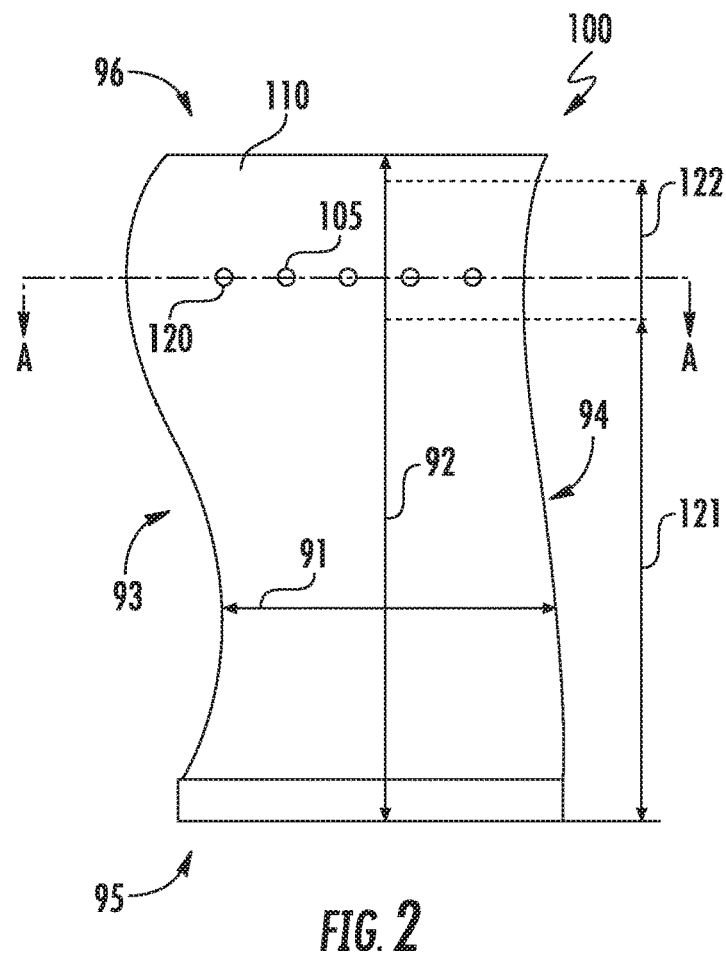
FIG. 2 is a side view of an exemplary embodiment of an airfoil of the gas turbine engine of FIG. 1 according to an aspect of the present disclosure.
Figure 3:
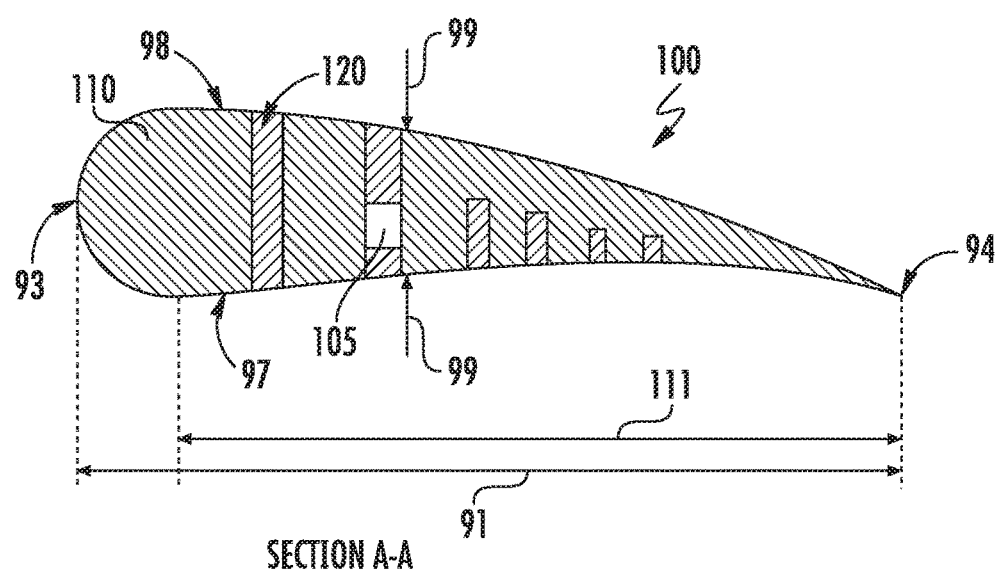
FIG. 3 is a Section A-A cross sectional view of the airfoil generally provided in FIG. 2.

Referring to FIGS. 2-3, the airfoil 100 defines a leading edge 93, a trailing edge 94, and a reference chordwise dimension 91 defined from the leading edge 93 and the trailing edge 94. The airfoil 100 further defines a root 95, a tip 96, and a reference spanwise dimension 92 defined from the root 95 and the tip 96. The airfoil 100 includes a first material substrate 110 defining a pressure side 97 and a suction side 98. The first material substrate 110 defines a plurality of discrete volumes 105 extended from at least one of the pressure side 97 or the suction side 98 into the first material substrate 110. The plurality of discrete volumes 105 is arranged at least partially along the chordwise dimension 91. A second material substrate 120 different from the first material substrate 110 is defined within the volume 105.

In various embodiments, the second material substrate 120 defines a material that yields or otherwise deforms at a lesser load than the first material substrate 110. As such, the plurality of volumes 105 defined through the first material substrate 110 enables the airfoil 100 to break or deform substantially at the spanwise dimension 92 at which the volumes 105 are defined through the first material substrate 110. In one embodiment, the second material substrate 120 is a filler material. For example, the second material substrate 120 may define an epoxy material, such as to at least partially fill the volume 105. More specifically, the second material substrate 120 may be defined approximately flush or level to the pressure side 97, the suction side 98, or both, of the first material substrate 110. As such, the second material 120 may substantially conform to a contour of the pressure side 97, the suction side 98, or both, such as to mitigate or eliminate aerodynamic losses (e.g., drag) across the airfoil 100 due at least in part to the volume 105 defined through the first material substrate 110.

Still further, in various embodiments, such as shown in FIG. 3, the volume 105 is defined from the pressure side 97 of the airfoil 100 into the first material substrate 110. For example, the volume 105 may be defined through the pressure side 97 such as to reduce aerodynamic losses across the airfoil 110 in contrast to the suction side 98.

Referring still to FIG. 3, a cross sectional view of the airfoil 100 of FIG. 2 at Section A-A is generally provided. The airfoil 100 defines a thickness 99 from the pressure side 97 to the suction side 98. The volume 105 is defined through at least approximately 85% of the thickness 99 of the airfoil 100. It should be appreciated that in various embodiments, the thickness 99 of the airfoil 100 may be defined or measured relative to a reference chord line extended straight and connecting the leading edge 93 and the trailing edge 94. In one embodiment, the thickness 99 may be measured perpendicular relative to the chord line. In other embodiments, the thickness 99 of the airfoil 100 may be defined or measured relative to a reference camber line or mean line extended midway between the pressure side 97 and the suction side 98. In one embodiment, the thickness 99 may be measured perpendicular relative to the camber line extended through the airfoil 100. In the various embodiments of the airfoil 100 described and shown in regard to FIGS. 2-10, although the thickness 99 of the airfoil 100 and the volume 105 extended therethrough may be based on the chord line and reference chordwise dimension 91, it should be appreciated that the thickness 99, the volume 105, or both may be defined, translated, or otherwise related to the camber line of the airfoil 100.

Referring back to FIG. 2, the volume 105 may be defined within approximately 90% to approximately 97% of the spanwise dimension 92 of the airfoil 100 from the root 95. For example, a first reference spanwise dimension 121 may generally depict an approximately 90% spanwise dimension 92 of the airfoil 100 from the root 95. A second reference spanwise dimension 122 may generally depict an approximately 97% spanwise dimension 92 of the airfoil 100 from the root 95. The plurality of volumes 105 may be defined within the first and second reference spanwise dimensions 121, 122, inclusively.

Referring now to FIG. 3, the plurality of discrete volumes 105 may be defined within approximately 95% of the chordwise dimension 91 from the trailing edge 94 of the airfoil 100. For example, a first reference chordwise dimension 111 may generally depict an approximately 95% chordwise dimension 91 of the airfoil 100 from the trailing edge 94. Alternatively, the plurality of discrete volumes 105 may be defined greater than approximately 5% of the chordwise dimension 91 from the leading edge 93 of the airfoil 100. In another embodiment, the plurality of discrete volumes 105 may be defined within approximately 85% of the chord wise dimension 91 from the trailing edge 94 of the airfoil 100. Alternatively, the plurality of discrete volumes 105 may be defined greater than approximately 15% of the chordwise dimension 91 from the leading edge 93 of the airfoil 100.

Figure 4:
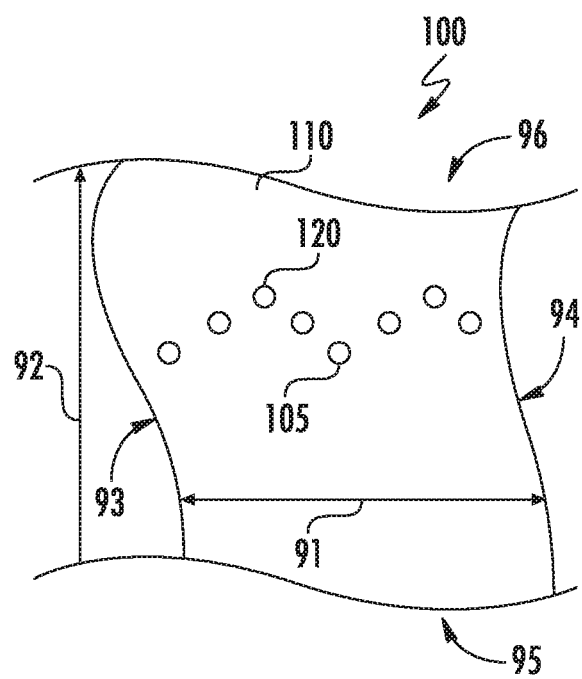
FIG. 4 is a side view of an exemplary embodiment of a portion of the airfoil generally provided in FIG. 2.

Referring now to FIG. 4, another exemplary embodiment of the airfoil 100 is generally provided. The airfoil 100 may be configured substantially similarly as described in regard to FIGS. 2-3. However, in FIG. 4 the volume 105 is defined at two or more spanwise dimensions 92 of the airfoil 100. For example, such as generally depicted in FIG. 4, the plurality of discrete volumes 105 may be defined approximately as a waveform along the pressure side 97, the suction side 98, or both, through the first material substrate 110. In one non-limiting example, such as generally provided in FIG. 4, the waveform may define a sine wave. In other non-limiting examples, the waveform may define a box or square wave, a triangle wave, or a sawtooth wave. In still other embodiments, the airfoil 100 may define two or more pluralities of rows of volumes 105 extended at least partially along the chordwise dimension 91 (e.g., FIG. 6B). In one embodiment, the two or more rows of volumes 105 are defined in generally staggered arrangement along the chordwise dimension 91 such that each volume 105 defines a chordwise dimension 91 along the pressure side 97, the suction side 98, or both, approximately unique relative to another volume 105.

Figure 5:
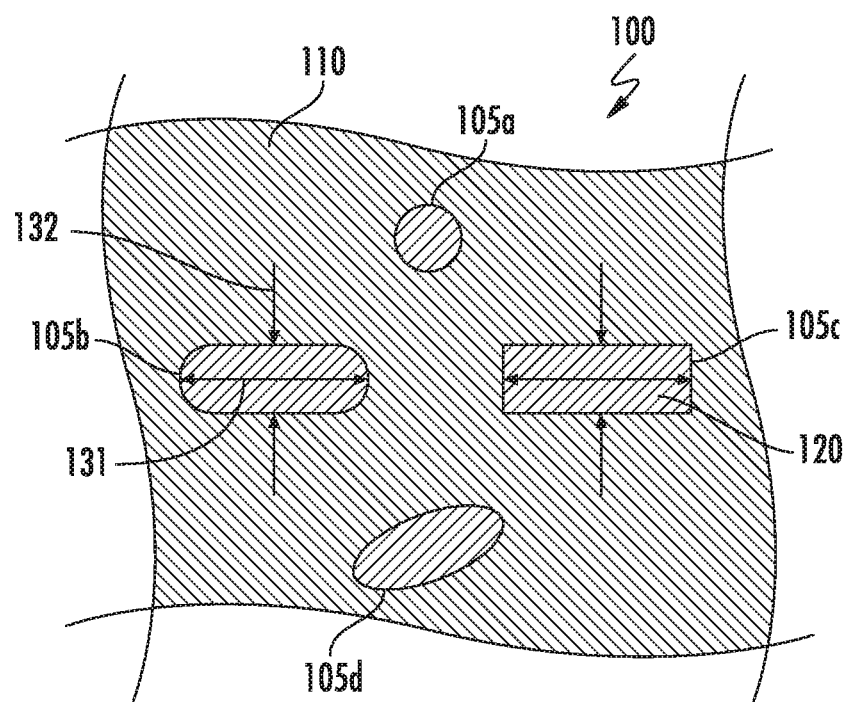
FIG. 5 is a side view of another exemplary embodiment of a portion of the airfoil generally provided in FIG. 2.

Referring now to FIG. 5, yet another exemplary embodiment of the airfoil 100 is generally provided. The airfoil 100 may be configured substantially similarly as described in regard to FIGS. 2-4. However, in FIG. 5 exemplary embodiments of cross sectional areas of the volume 105 through the first material substrate 110 are generally provided. In one embodiment, the volume 105 defines an approximately circular cross sectional area volume 105a through the pressure side 97, the suction side 98, or both. In another embodiment, the volume 105 defines a racetrack cross sectional area volume 105b. In still another embodiment, the volume 105 defines a rectangular cross sectional area volume 105c. In still yet another embodiment, the volume 105 defines an elliptical cross sectional area volume 105d through the first material substrate 110. In other embodiments, the volume 105 may define an oblong cross sectional area through the pressure side 97, the suction side 98, or both of the first material substrate 110 of the airfoil 100. It should be appreciated that various embodiments of the rectangular cross sectional area volume 105c or oblong cross sectional areas (e.g., polygons, stars, teardrops, etc.) may include at least partially rounded corners or edges, such as to mitigate crack propagation or other material failure.

In still various embodiments, the volume 105 defines a length 131 and a height 132 of the cross sectional area of the volume 105 through the first material substrate 110. The length 131 may be defined substantially along the chordwise dimension 91 and the height 132 may be defined substantially along the spanwise dimension 92. However, in other embodiments, the length 131 and/or the height 132 may be defined at least partially along each of the chordwise dimension 91 and the spanwise dimension 92. In various embodiments, the cross sectional area of the volume 105 may define a ratio of the length 131 versus the height 132 of approximately 3:1 or less. For example, in one embodiment, the length 131 may be approximately three times the height 132, such as to define a cross sectional area of the volume 105 extended at least partially along the chordwise dimension 91. In another embodiment, the ratio of the length 131 versus the height 132 may be inverted such that the length 131 may be approximately one-third or greater than the height 132, such as to define a cross sectional area of the volume 105 extended at least partially along the spanwise dimension 92. In still other embodiments, the ratio of the length 131 versus the height 132 may be approximately 1:1, such as to generally define a circular cross sectional area 105a.

Referring now to FIGS. 2-5, approximately 15% of less of a cross sectional area of the first material substrate 110 along the chordwise dimension 91 is defined by the volume 105 including the second material substrate 120. For example, along the pressure side 97 or the suction side 98 of the first material substrate 110 defining the airfoil 100, approximately 15% or less of the side 97, 98 between the leading edge 93 and the trailing edge 94 may define the second material substrate 120. In another embodiment, approximately 10% or less of the cross sectional area of the first material substrate 110 along the chordwise dimension 91 is defined by the volume 105 including the second material substrate 120. In still another embodiment, approximately 5% of less of the cross sectional area of the first material substrate 110 is defined by the volume 105 including the second material substrate 120.

Figure 6A:
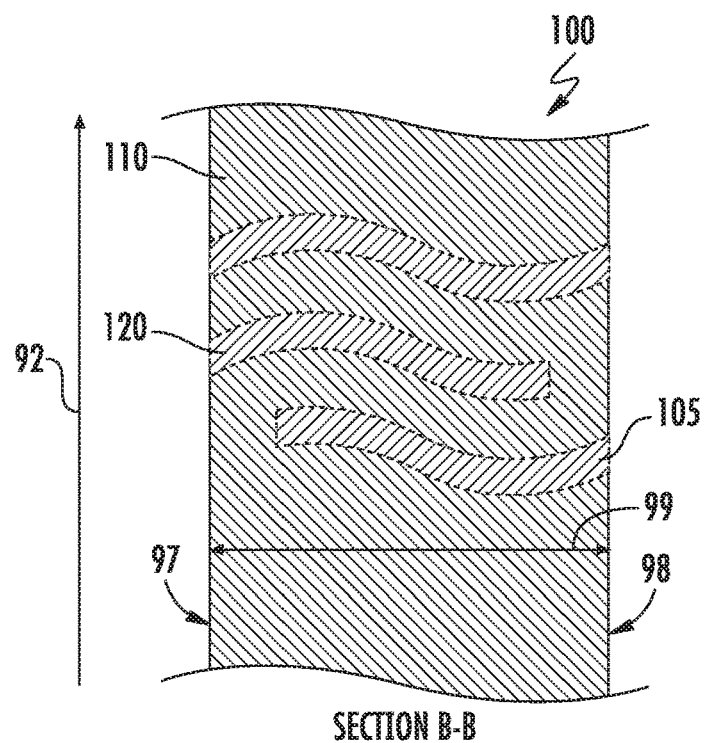
FIG. 6A is a Section B-B cross sectional view of an exemplary embodiment of the airfoil generally provided in FIG. 6C.
Figure 6B:
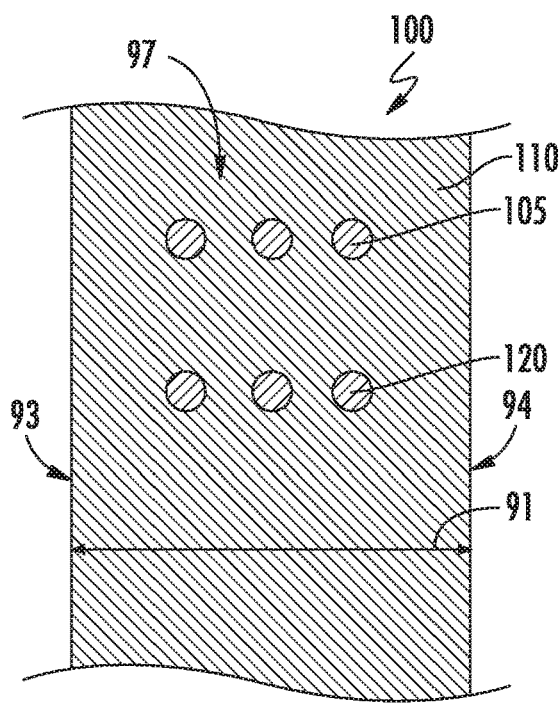
FIG. 6B is a side view of an exemplary embodiment of the airfoil generally provided in FIG. 6A.
Figure 6C:
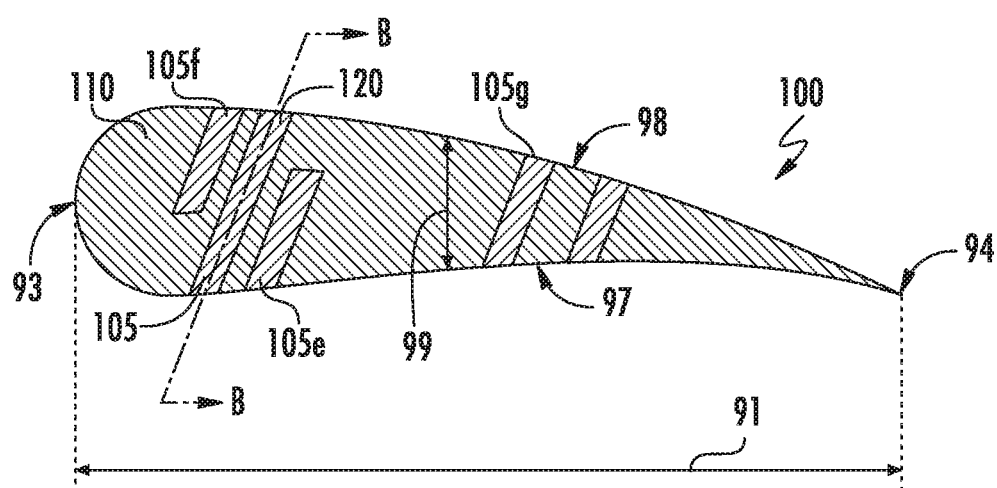
FIG. 6C is a cross sectional view of another exemplary embodiment of the airfoil generally provided in FIG. 2.
Figure 7:
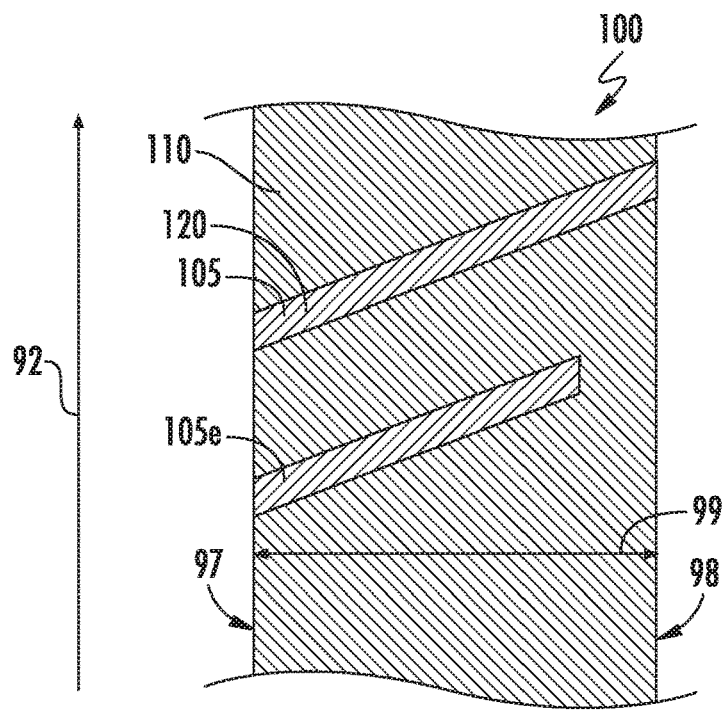
FIGS. 7-8 are side views of exemplary embodiments of the airfoil generally provided in FIG. 2.
Figure 8:
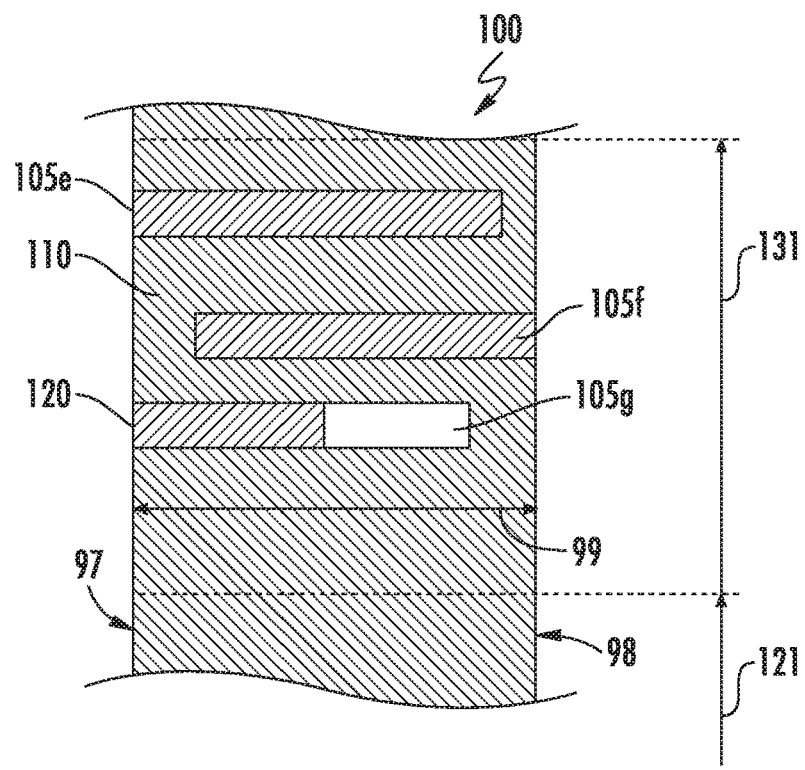

Referring now to FIGS. 6-8 exemplary embodiments of the volume 105 extended through the first material substrate 110 are generally provided. The view of Section B-B (FIG. 6C) in FIGS. 6-8 generally provides various embodiments of the volume 105 extended through the first material substrate 110 of the airfoil 100. Referring to FIGS. 6A, 6B, and 6C, in various embodiments, the volume 105 may be defined at least partially along the spanwise dimension 92. In the embodiment generally provided in FIG. 6A, the volume 105 may extend in an at least partially serpentine definition through the first material substrate 110 (e.g., up and down through the thickness 99 of the first material substrate 110 along the spanwise dimension 92). Referring to FIG. 7, the volume 105 may extend at least partially through the first material substrate 110 generally linearly along the spanwise dimension 92 and the chordwise dimension 91.

In another embodiment, such as generally provided in FIG. 6C, the volume 105 is extended at least partially along the chordwise dimension 91 of the airfoil 100 through the first material substrate 110.

In still various embodiments generally provided in FIGS. 6-8, the volume 105 may extend from the pressure side 97 through the entire thickness 99 of the airfoil 100 to the suction side 98. In another embodiment, the volume 105, depicted as first volume 105e, is extended partially through the first material substrate 110 from the pressure side 97. In yet another embodiment, the volume 105, depicted as second volume 105f, is extended partially through the first material substrate 110 from the suction side 98.

In various embodiments of the airfoil 100 depicted in FIGS. 2-10, the volume 105 may be at least substantially filled with the second material substrate 120. In other embodiments, such as generally provided in regard to FIGS. 6C and 8, the second material substrate 120 may partially fill the volume 105, depicted as volume 105g. For example, as previously described, the second material substrate 120 may be defined substantially flush or even with the pressure side 97 or the suction side 98 of the airfoil 100. The volume 105g may be partially void of the second material substrate 120. Still further, in various embodiments, the volume 105 may define a generally constant cross sectional area therethrough (e.g., a bore into the first material substrate 110). In another embodiment, the volume 105 may define a generally variable cross sectional area (e.g., a countersink bore into the first material substrate 110). For example, the volume 105 may define a smaller opening through the suction side 98 in contrast to the pressure side 97 (or vice versa).

Figure 9:
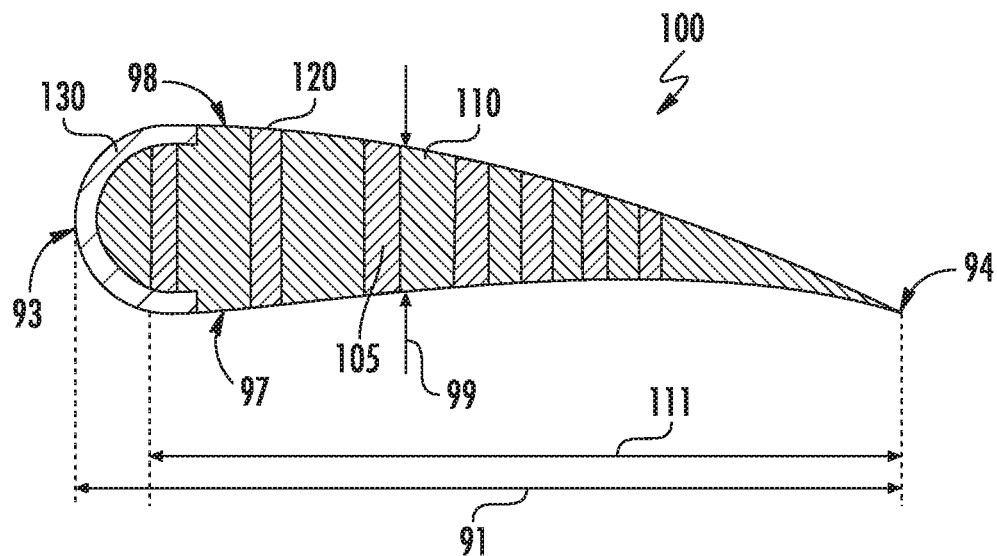
FIGS. 9-10 are cross sectional views of exemplary embodiments of the airfoil generally provided in FIG. 2.
Figure 10:
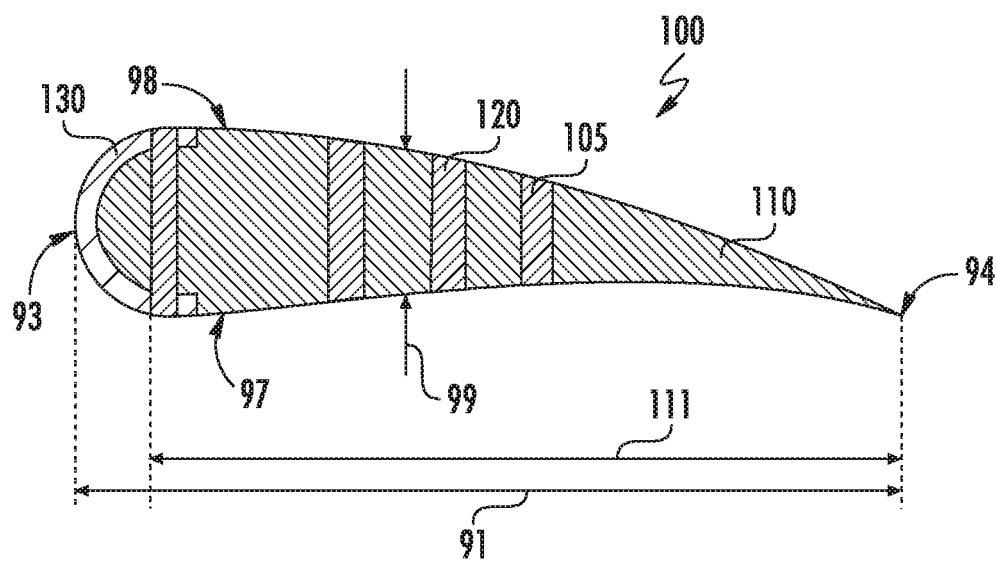

Referring now to FIGS. 9-10, the airfoil 100 may further include a third material layer 130 at least partially surrounding the first material substrate 110. In various embodiments, the third material layer 130 may completely surround the first material substrate 110. In other embodiments, such as generally provided in FIGS. 9-10, the third material layer 130 is defined over approximately 15% of less of the chordwise dimension 91 from the leading edge 93 along the pressure side 97, the suction side 98, or both. For example, at least a portion of the third material layer 130 may overlap the first reference chordwise dimension 111, such that the volume 105 may be defined within the first material substrate 110 within the third material layer 130.

In another embodiment, such as generally provided in FIG. 10, the volume 105 is further defined at least partially through the third material layer 130 from the pressure side 97, the suction side 98, or both. In still another embodiment, the second material substrate 120 at least substantially fills the volume 105 through the third material layer 130. In various embodiments, the second material substrate 120 is generally flush or level at the pressure side 97, the suction side 98, or both, at the third material layer 130. In another embodiment, the second material substrate 120 generally fills the volume 105 at the third material layer 130. In still another embodiment, the volume 105 may be at least partially void at the first material substrate 110 within the third material layer 130, such as generally provided at volume 105g in FIGS. 6C and 8.

Referring now to FIGS. 1-10, in still various embodiments, the airfoil 100 may selectively alter the volumes 105 between at least one of the volumes 105, 105a, 105b, 105c, 105d, 105e, 105f, 105g described herein such as to enable the airfoil 100 to fracture, break, or liberate following a desired loading or impact upon the airfoil 100. For example, the airfoil 100 configured as the fan blade 42 within the fan case or nacelle 44 of the engine 10 (FIG. 1) may be configured to detach, decouple, deform, break, or liberate a frangible portion of the airfoil 100 above the spanwise dimension 92 of the volumes 105. In one non-limiting example, the frangible portion of the airfoil 100 may be defined as the difference in spanwise dimension 92 from the spanwise dimension 92 of the volumes 105. For example, the frangible portion of the airfoil 100 may be defined within approximately 3% to approximately 10% from the tip 96 of the airfoil 100.

During operation of the engine 10, as shown in FIGS. 1-10 collectively, a volume of air as indicated schematically by arrows 74 enters the engine 10 through an associated inlet 76 of the nacelle and/or fan assembly 14. As the air 74 passes across the blades 42 of the fan assembly 14, a portion of the air as indicated schematically by arrows 78 is directed or routed into the bypass airflow passage 48 while another portion of the air as indicated schematically by arrows 80 is directed or through the fan assembly 14. Air 80 is progressively compressed as it flows through the compressor section 21 toward the combustion section 26.

The now compressed air, as indicated schematically by arrows 82, flows into the combustion section 26 where a fuel is introduced, mixed with at least a portion of the compressed air 82, and ignited to form combustion gases 86. The combustion gases 86 flow into the turbine section 31, causing rotary members of the turbine section 31 to rotate and support operation of respectively coupled rotary members in the compressor section 21 and/or fan assembly 14.

During operation of the engine 10, such as following an event generating substantial imbalance in the fan rotor 38 or LP shaft 36, the frangible portion of the airfoil 100, as the fan blade 42, as shown and described in various embodiments in FIGS. 2-10 may be configured to deform or partially or fully detach from the remainder of the airfoil 100. Events generating substantial unbalance in the fan rotor 38 and/or LP shaft 36 may include, but are not limited to, foreign object damage (e.g., bird strikes, ice ingestion, other debris, etc.) or fan blade 42 detachment. Detaching or decoupling the frangible portion of the airfoil 100 may reduce undesired unbalance or vibrations as the fan rotor 38 and/or LP shaft 36 continue to rotate. Furthermore, the embodiments of the airfoil 100 generally shown and described in regard to FIGS. 1-10 may enable lighter fan cases or nacelles 44, such as reducing an amount of metal materials or abradable material of the fan case or nacelle 44.

The embodiments of the airfoil 100 generally shown and described in regard to FIGS. 1-10 may be formed of one or more materials generally utilized for gas turbine engine airfoils. Such materials may include, but are not limited to, steel, titanium, aluminum, nickel, or alloys of each, or composite materials, or combinations thereof. Composite materials may include, but are not limited to, metal matrix composites (MMCs), polymer matrix composites (PMCs), or ceramic matrix composites (CMCs). Furthermore, the airfoil 100 may be formed of a combination of metal and composite materials. As one non-limiting example, the first material substrate 110 may define a metal. As another non-limiting example, the first material substrate 110 may define a composite material and the third material layer 130 may define a metal. As yet another non-limiting example, the first material substrate 110 may define a partially or substantially hollow structure within the pressure side 97, the suction side 98, the leading edge 93, and the trailing edge 94.

Composite materials, such as may be utilized in the airfoil 100, generally comprise a fibrous reinforcement material embedded in matrix material, such as polymer, ceramic, or metal material. The reinforcement material serves as a load-bearing constituent of the composite material, while the matrix of a composite material serves to bind the fibers together and act as the medium by which an externally applied stress is transmitted and distributed to the fibers.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYL-RAIVIIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

Similarly, in various embodiments, PMC materials may be fabricated by impregnating a fabric or unidirectional tape with a resin (prepreg), followed by curing. For example, multiple layers of prepreg may be stacked to the proper thickness and orientation for the part, and then the resin may be cured and solidified to render a fiber reinforced composite part. As another example, a die may be utilized to which the uncured layers of prepreg may be stacked to form at least a portion of the composite component. The die may be either a closed configuration (e.g., compression molding) or an open configuration that utilized vacuum bag forming. In the open configuration, the die forms one side of the blade (e.g., the pressure side 97 or the suction side 98). The PMC material is placed inside of a bag and a vacuum is utilized to hold the PMC material against the die during curing. In still other embodiments, the airfoil 100 may be at least partially formed via resin transfer molding (RTM), light resin transfer molding (LRTM), vacuum assisted resin transfer molding (VARTM), a forming process (e.g. thermoforming), or similar.

Prior to impregnation, the fabric may be referred to as a "dry" fabric and typically comprises a stack of two or more fiber layers (plies). The fiber layers may be formed of a variety of materials, non-limiting examples of which include carbon (e.g., graphite), glass (e.g., fiberglass), polymer (e.g., Kevlar®) fibers, and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. Other embodiments may include other textile forms such as plane weave, twill, or satin.

In one embodiment, PMC materials can be produced by dispersing dry fibers into a mold, and then flowing matrix material around the reinforcement fibers. Resins for PMC matrix materials can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermosplastic resins include nylons, thermoplastic polyesters, polyaryletherketones, and polycarbonate resins. Specific examples of high performance thermoplastic resins that have been contemplated for use in aerospace applications include polyetheretherketone (PEEK), polyetherketoneketone (PEKK), polyetherimide (PEI), and polyphenylene sulfide (PPS). In contrast, once fully cured into a hard rigid solid, thermoset resins do not undergo significant softening when heated but, instead, thermally decompose when sufficiently heated. Notable examples of thermoset resins include epoxy, bismaleimide (BMI), and polyimide resins.

Various embodiments of the airfoil 100 may be partially or approximately entirely formed from a plurality of plies of the composite material, such as the first material substrate 110 or the third material layer 130, which are laid up together and/or assembled with other sub-assemblies, such as ply packs, preforms, and/or a stack of composite plies, to define the composite component. In still various embodiments, the third material layer 130 may define a metal material such as to define a metal leading edge of the airfoil 100, or more specifically, a fan blade 42. The metal leading edge may generally provide protection against foreign object debris and damage, such as, but not limited to, bird strikes, ice ingestion, or other matter, projectiles, or objects impacting the airfoil 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An airfoil defining a chordwise dimension, a spanwise dimension, a leading edge, a trailing edge, a root, and a tip, the airfoil comprising:
   a first material substrate defining a pressure side and a suction side,
   wherein the first material substrate is extended from the leading edge to the trailing edge of the airfoil,
   wherein the first material substrate defines a plurality of volumes extended from at least one of the pressure side or the suction side into the first material substrate,
   wherein the plurality of volumes are arranged at least partially along the chordwise dimension,
   wherein a second material substrate different from the first material substrate is defined at least partially within the plurality of volumes, and
   wherein the plurality of volumes are defined within 90% to 97% of the spanwise dimension from the root of the airfoil.

2. The airfoil of claim 1, wherein the plurality of volumes are defined at two or more spanwise dimensions of the airfoil.

3. The airfoil of claim 2, wherein the plurality of volumes are defined as a waveform along the pressure side, the suction side, or both, through the first material substrate.

4. An airfoil defining a chordwise dimension, a spanwise dimension, a leading edge, a trailing edge, a root, and a tip, the airfoil comprising:
   a first material substrate defining a pressure side and a suction side,
   wherein the first material substrate is extended from the leading edge to the trailing edge of the airfoil,
   wherein the first material substrate defines a plurality of volumes extended from at least one of the pressure side or the suction side into the first material substrate,
   wherein the plurality of volumes are arranged at least partially along the chordwise dimension,
   wherein a second material substrate different from the first material substrate is defined at least partially within the plurality of volumes,
   wherein the airfoil further comprises a third material layer at least partially surrounding the first material substrate,
   wherein the third material layer is defined over 15% or less of the chordwise dimensions from the leading edge along the pressure side, the suction side, or both,
   wherein the plurality of volumes are defined at least partially through the third material layer from the pressure side, the suction side, or both, and
   wherein the second material substrate at least fills the plurality of volumes through the third material layer.

* * * * *